(12) United States Patent
Huck et al.

(10) Patent No.: US 8,267,657 B2
(45) Date of Patent: Sep. 18, 2012

(54) NOISE REDUCER FOR ROTOR BLADE IN WIND TURBINE

(75) Inventors: Robert Karl Huck, Greenville, SC (US); Kevin Wayne Kinzie, Spartanburg, SC (US); James Paul Davidson, Greenville, SC (US); Roger Drobietz, Rheine (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/970,119

(22) Filed: Dec. 16, 2010

(65) Prior Publication Data

US 2011/0223030 A1 Sep. 15, 2011

(51) Int. Cl.
*F04D 29/38* (2006.01)
(52) U.S. Cl. ............................ 416/62; 416/228; 416/235
(58) Field of Classification Search .................. 416/228, 416/235, 236 R, 500, 62, 501, 248; 244/200.1
See application file for complete search history.

(56) References Cited

U.S. PATENT DOCUMENTS

| | | | |
|---|---|---|---|
| 175,355 A | 3/1876 | King | |
| 573,562 A | 12/1896 | Wittram | |
| 1,861,065 A | 5/1932 | Poot | |
| 2,071,012 A * | 2/1937 | Adams | 244/1 R |
| 2,238,749 A | 4/1941 | Peltier | |
| D131,271 S | 2/1942 | Colura | |
| 2,312,219 A | 4/1943 | Sensenich | |
| 2,899,128 A | 8/1959 | Vaghi | |
| 4,089,618 A | 5/1978 | Patel | |
| 4,618,313 A | 10/1986 | Mosiewicz | |
| 4,720,244 A | 1/1988 | Kluppel et al. | |
| 5,088,665 A | 2/1992 | Vijgen et al. | |
| 5,320,491 A | 6/1994 | Coleman et al. | |
| 5,328,329 A | 7/1994 | Monroe | |
| 5,522,266 A | 6/1996 | Nicholson et al. | |
| 5,533,865 A | 7/1996 | Dassen et al. | |
| 6,491,260 B2 * | 12/2002 | Borchers et al. | 244/199.1 |
| 6,729,846 B1 | 5/2004 | Wobben | |
| 6,733,240 B2 | 5/2004 | Gilebe | |
| 6,779,978 B2 | 8/2004 | Camargo Do Amarante | |
| 6,789,769 B2 | 9/2004 | Mau et al. | |
| 6,830,436 B2 | 12/2004 | Shibata et al. | |
| 7,059,833 B2 * | 6/2006 | Stiesdal et al. | 416/41 |

(Continued)

FOREIGN PATENT DOCUMENTS

EP 2028366 2/2009

(Continued)

OTHER PUBLICATIONS

Co-pending U.S. Appl. No. 12/861,145, filed Aug. 23, 2010.

(Continued)

*Primary Examiner* — Edward Look
*Assistant Examiner* — Adam W Brown
(74) *Attorney, Agent, or Firm* — Dority & Manning, P.A.

(57) ABSTRACT

A rotor blade assembly for a wind turbine is disclosed. The rotor blade assembly includes a rotor blade having surfaces defining a pressure side, a suction side, a leading edge, and a trailing edge extending between a tip and a root. The rotor blade assembly further includes a noise reducer configured on a surface of the rotor blade. The noise reducer includes a plurality of noise reduction features and a plurality of auxiliary noise reduction features. Each of the plurality of auxiliary noise reduction features is configured on one of the plurality of noise reduction features.

20 Claims, 5 Drawing Sheets

U.S. PATENT DOCUMENTS

| | | |
|---|---|---|
| 7,328,770 B2 * | 2/2008 | Owens et al. ............... 181/207 |
| 7,351,041 B2 | 4/2008 | Uselton et al. |
| 7,413,408 B1 | 8/2008 | Tafoya |
| 7,458,777 B2 | 12/2008 | Herr |
| 7,632,068 B2 | 12/2009 | Bak et al. |
| 7,637,721 B2 | 12/2009 | Driver et al. |
| 7,740,206 B2 | 6/2010 | Eaton et al. |
| 7,976,283 B2 | 7/2011 | Huck |
| 2003/0175121 A1 | 9/2003 | Shibata et al. |
| 2004/0253114 A1 | 12/2004 | Gunneskov et al. |
| 2007/0025858 A1 | 2/2007 | Driver et al. |
| 2007/0041823 A1 | 2/2007 | Miller |
| 2007/0065290 A1 | 3/2007 | Herr |
| 2007/0077150 A1 | 4/2007 | Llorente Gonzalez |
| 2008/0061192 A1 | 3/2008 | Sullivan |
| 2008/0080977 A1 | 4/2008 | Bonnet |
| 2008/0107540 A1 | 5/2008 | Bonnet |
| 2008/0166241 A1 | 7/2008 | Herr et al. |
| 2008/0187442 A1 * | 8/2008 | Standish et al. ............... 416/235 |
| 2008/0298967 A1 | 12/2008 | Matesanz Gil et al. |
| 2009/0016891 A1 | 1/2009 | Parsania et al. |
| 2009/0074585 A1 | 3/2009 | Koegler et al. |
| 2009/0097976 A1 | 4/2009 | Driver et al. |
| 2009/0104038 A1 | 4/2009 | Grabau |
| 2010/0028161 A1 | 2/2010 | Vronsky et al. |
| 2010/0104436 A1 | 4/2010 | Herr et al. |
| 2010/0329879 A1 | 12/2010 | Presz, Jr. et al. |

FOREIGN PATENT DOCUMENTS

| | | |
|---|---|---|
| EP | 2053240 | 4/2009 |
| EP | 2216545 | 8/2010 |
| JP | 2000120524 | 4/2000 |
| JP | 2003254225 | 9/2003 |
| WO | WO 2004/088130 | 10/2004 |
| WO | WO 2008/035149 | 3/2008 |
| WO | WO 2008/113349 | 9/2008 |
| WO | WO 2009/025549 | 2/2009 |

OTHER PUBLICATIONS

Co-pending U.S. Appl. No. 12/946,249, filed Nov. 15, 2010.
Co-pending U.S. Appl. No. 12/939,531, filed Nov. 4, 2010.
Co-pending U.S. Appl. No. 12/943,135, filed Nov. 10, 2010.
Abstract of WO98/021091, May 22, 1998.

* cited by examiner

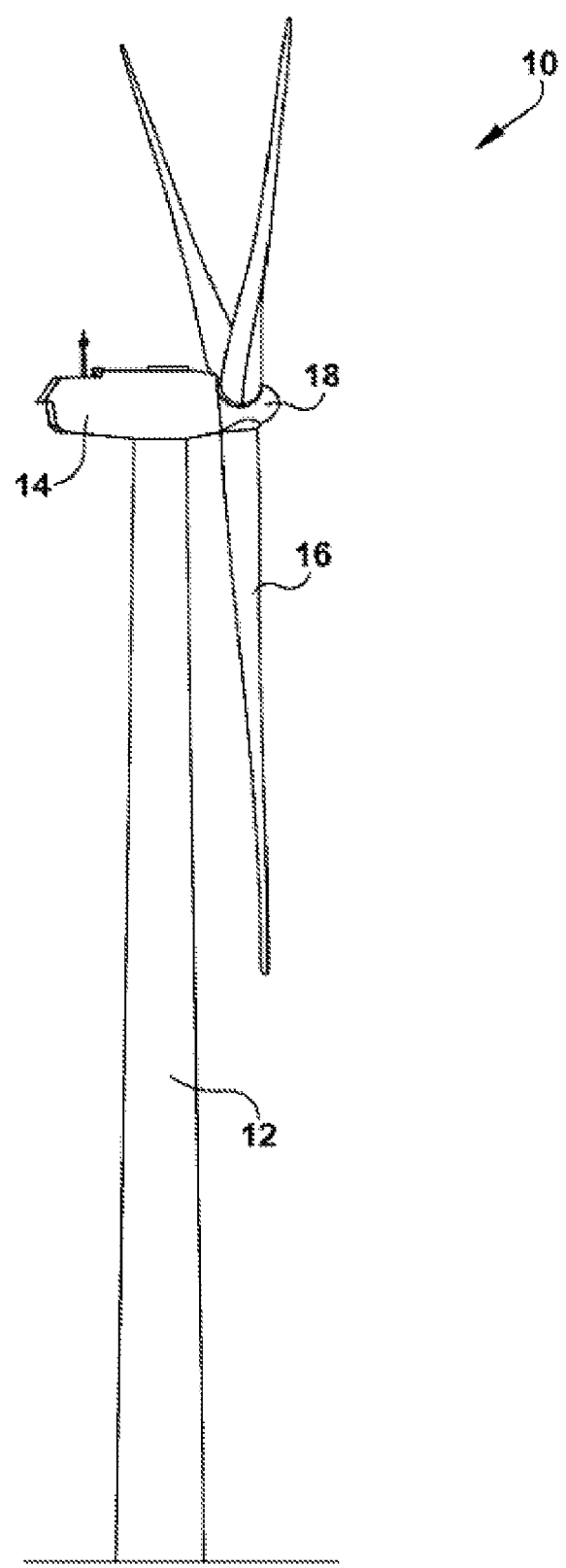
FIG. -1-

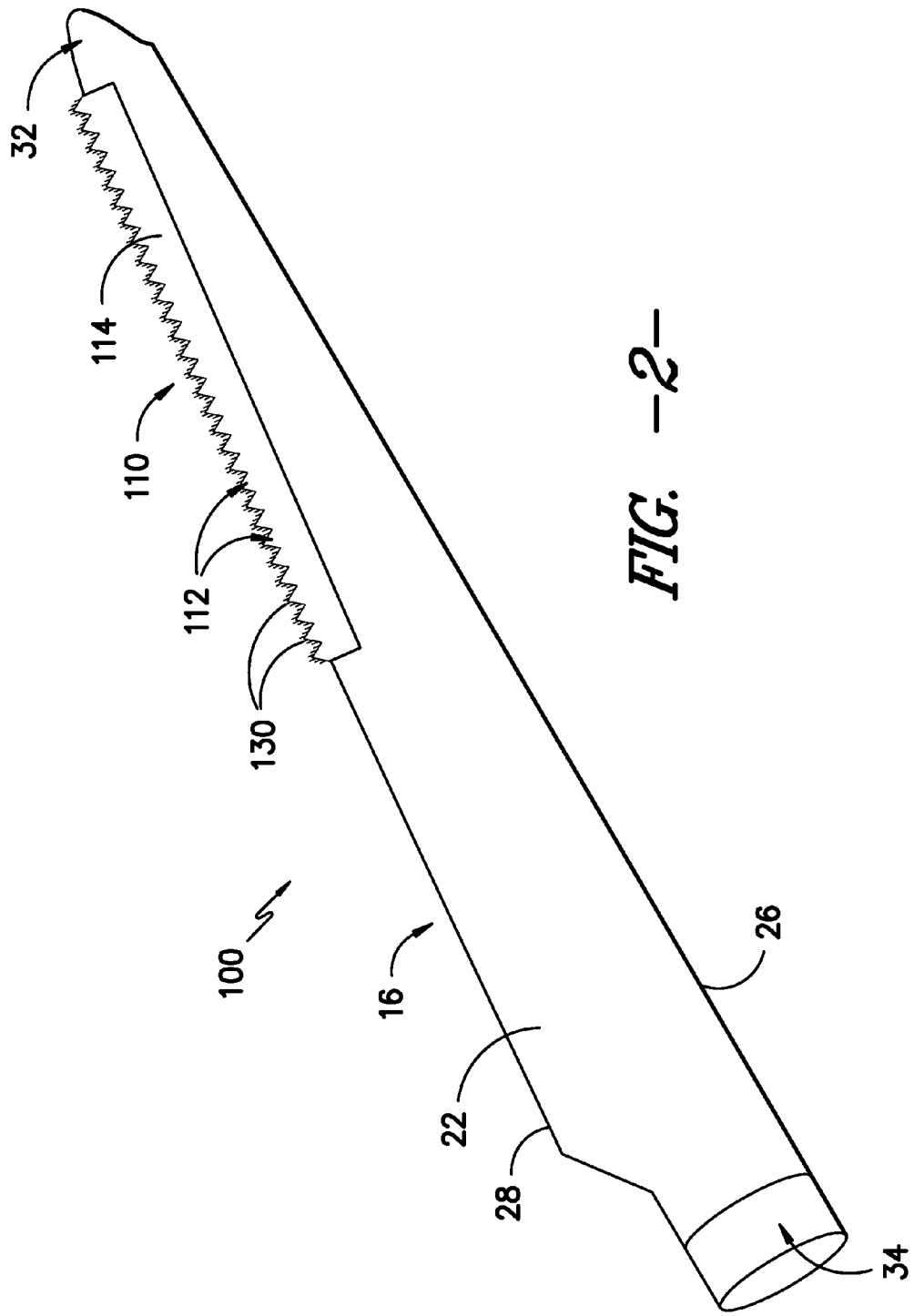

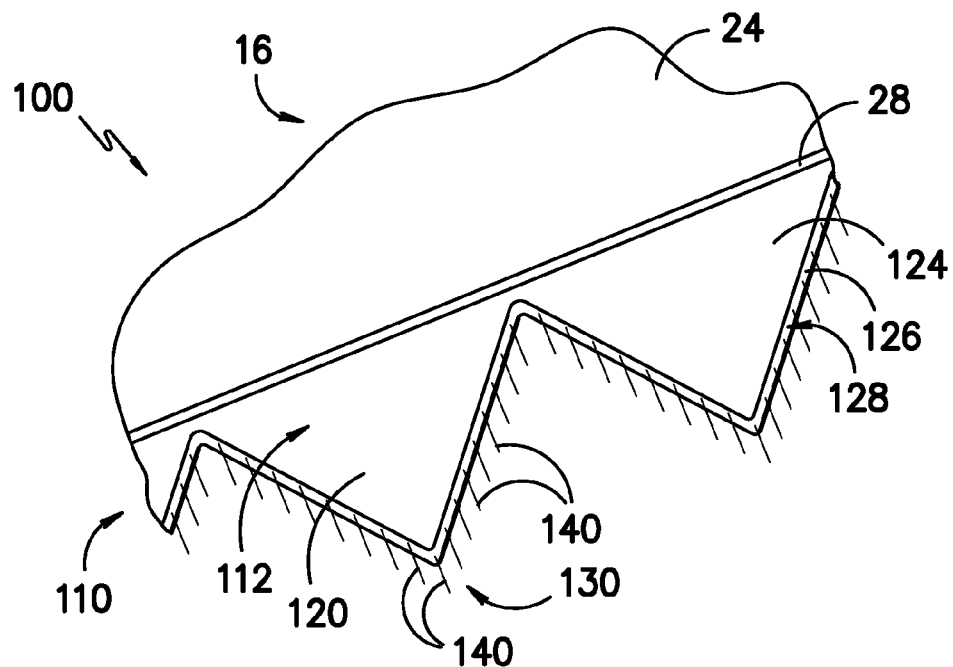
FIG. -3-
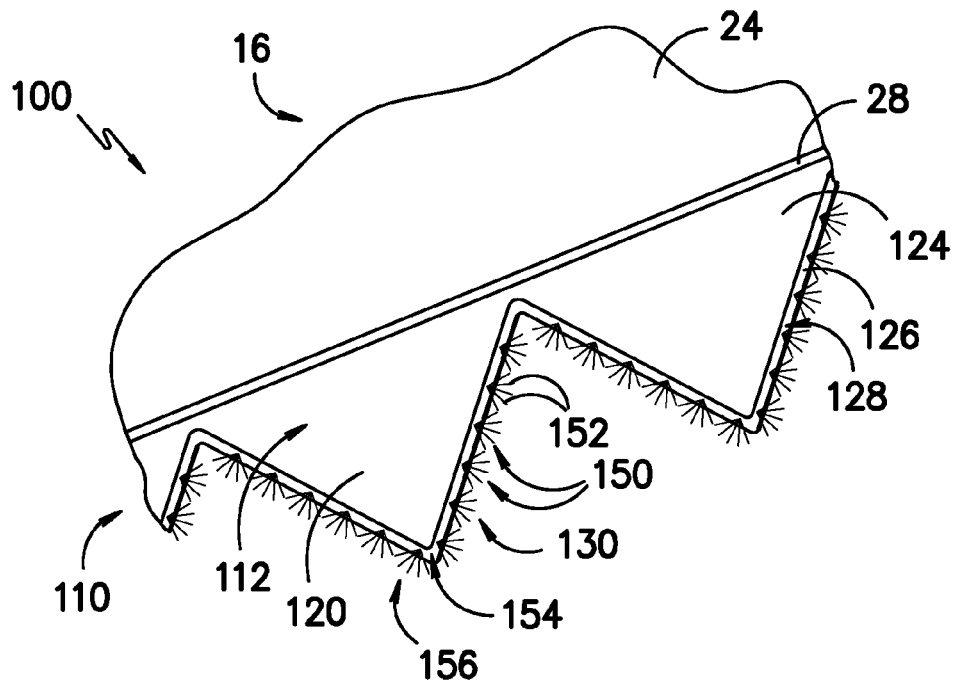
FIG. -4-

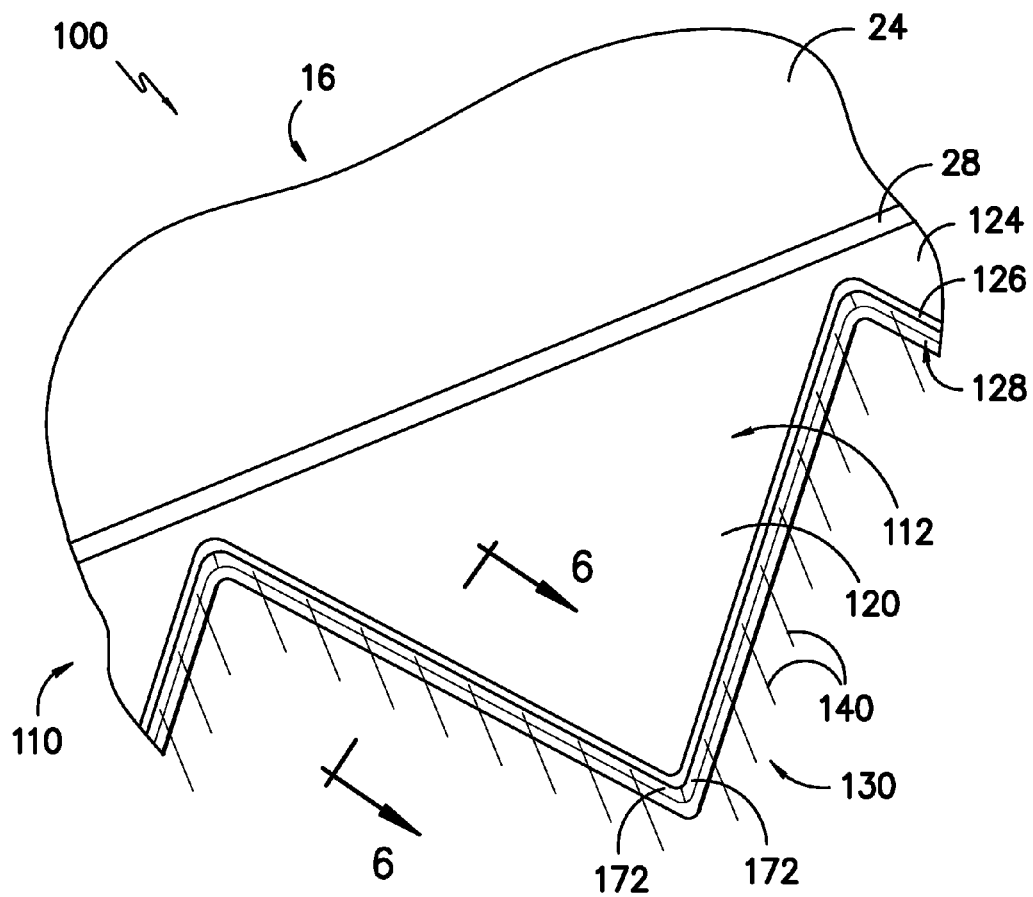
FIG. -5-
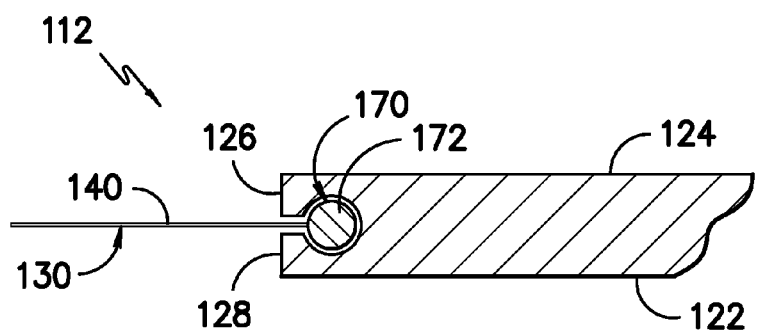
FIG. -6-

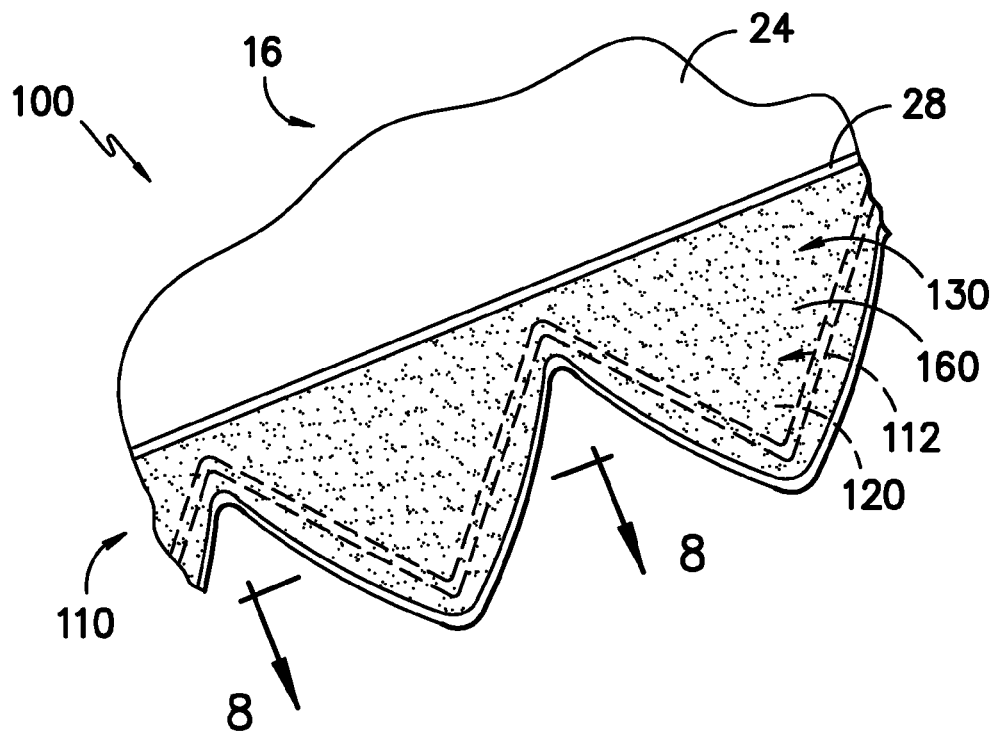
FIG. -7-
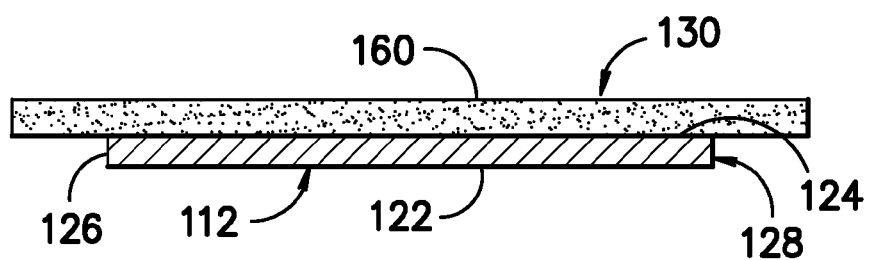
FIG. -8-

NOISE REDUCER FOR ROTOR BLADE IN WIND TURBINE

FIELD OF THE INVENTION

The present disclosure relates in general to wind turbine rotor blades, and more particularly to noise reducers configured on the rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

In many cases, various components are attached to the rotor blades of wind turbines to perform various functions during operation of the wind turbines. These components may frequently be attached adjacent the trailing edges of the rotor blades. For example, noise reducers may be attached adjacent the trailing edges of the rotor blades to reduce the noise and increase the efficiency associated with the rotor blades. However, typical prior art noise reducers have a variety of disadvantages, and may not adequately reduce the noise associated with typical rotor blades. For example, many currently know noise reducers include a plurality of serrations. The serrations are designed to reduce noise when the wind flow over the noise reducer flows in a certain direction. If the direction of wind flow is altered, however, the effectiveness of the serrations in reducing the noise may be reduced.

Thus, an improved noise reducer for a rotor blade would be desired. For example, a noise reducer with improved noise reduction features would be advantageous. Specifically, a noise reducer with noise reduction features that have improved responses to wind flow over the noise reducer would be desired.

BRIEF DESCRIPTION OF THE INVENTION

Aspects and advantages of the invention will be set forth in part in the following description, or may be obvious from the description, or may be learned through practice of the invention.

A rotor blade assembly for a wind turbine is disclosed. The rotor blade assembly includes a rotor blade having surfaces defining a pressure side, a suction side, a leading edge, and a trailing edge extending between a tip and a root. The rotor blade assembly further includes a noise reducer configured on a surface of the rotor blade. The noise reducer includes a plurality of noise reduction features and a plurality of auxiliary noise reduction features. Each of the plurality of auxiliary noise reduction features is configured on one of the plurality of noise reduction features.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of one embodiment of a wind turbine of the present disclosure;

FIG. 2 is a perspective view of one embodiment of a rotor blade assembly of the present disclosure;

FIG. 3 is a perspective view of one embodiment of a noise reducer of the present disclosure;

FIG. 4 is a perspective view of another embodiment of a noise reducer of the present disclosure;

FIG. 5 is a perspective view of another embodiment of a noise reducer of the present disclosure;

FIG. 6 is a cross-sectional view, through the lines 6-6 of FIG. 5, of one embodiment of a noise reducer of the present disclosure;

FIG. 7 is a perspective view of another embodiment of a noise reducer of the present disclosure; and, FIG. 8 is a cross-sectional view, through the lines 8-8 of FIG. 7, of one embodiment of a noise reducer of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring to FIG. 2, a rotor blade 16 according to the present disclosure may include surfaces defining a pressure side 22 and a suction side 24 (see FIGS. 3 through 5 and 7) extending between a leading edge 26 and a trailing edge 28, and may extend from a blade tip 32 to a blade root 34.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

As illustrated in FIGS. 2 through 8, the present disclosure may further be directed to a rotor blade assembly 100. The rotor blade assembly 100 may include a noise reducer 110 and the rotor blade 16. In general, the noise reducer 110 may be configured on a surface of the rotor blade 16, and may reduce the aerodynamic noise being emitted from the rotor blade 16 during operation of the wind turbine 10 and/or increase the efficiency of the rotor blade 16. In an exemplary embodiment of the present disclosure, the noise reducer 110 may be configured on a surface of the rotor blade 16 adjacent the trailing edge 28 of the rotor blade 16. Alternatively, the noise reducer 110 may be configured on a surface of the rotor blade 16 adjacent the leading edge 26 of the rotor blade 16, or adjacent the tip 32 or the root 34 of the rotor blade 16, or at any other suitable position on the rotor blade 16.

In exemplary embodiments, as shown in FIG. 2, the noise reducer 110 may configured on, such as mounted to, the pressure side 22 of the rotor blade 16. In alternative embodiments, the noise reducer 110 may be configured on, such as mounted to, the suction side 24. In yet other alternative embodiments, the noise reducer 110 may be configured on the rotor blade 16 between the pressure side 22 and the suction side 24.

For example, the noise reducer 110 may be configured on the trailing edge 28 between the pressure side 22 and the suction side 24. In this embodiment, the rotor blade 16 may be formed from one or more shell portions. For example, one shell portion may include the pressure side 22 and extend between the leading edge 26 and the trailing edge 28, while another shell portion may include the suction side 24 and extend between the leading edge 26 and the trailing edge 28. The noise reducer 110 may be mounted between these shell portions such that a portion of the noise reducer 110 is disposed in the interior of the rotor blade 16, while another portion extends from the rotor blade 16. Alternatively, the noise reducer 110 may extend through a shell portion of the rotor blade 16 at a desired location, such as at the trailing edge 28. In further alternative embodiments, the noise reducer 110 may be mounted directly to the exterior of the rotor blade 16 between the pressure side 22 and the suction side 24 through the use of, for example, a suitable adhesive or suitable mechanical fasteners. For example, in exemplary embodiments, the noise reducer 110 may be mounted directly to the trailing edge 28.

As shown in FIGS. 2 through 8, the noise reducer 110 of the present disclosure includes a plurality of noise reduction features 112. In general, the noise reduction features 112 may interact with the wind flow past the noise reducer 110 when the rotor blade assembly 100 is in operation, and may reduce the noise associated with the rotor blade 16.

In some embodiments, as shown in FIG. 2, the noise reducer 110 may include a base plate 114. In these embodiments, the base plate 114 may generally be that portion of the noise reducer 110 that is mounted to the rotor blade 16 to configure the noise reducer 110 on a surface of the rotor blade 16, and the noise reduction features 112 may extend from the base plate 114. Alternatively, the noise reduction features 112 may be mounted directly to the rotor blade 16, or may be an integral part of the rotor blade 16. For example, in some embodiments wherein the noise reducer 110 is mounted adjacent the trailing edge 28, the noise reduction features 112 may extend directly from the trailing edge 28.

The noise reducer 110 may, in some embodiments, be formed from a plurality of noise reducer sections. Each section may include one or more noise reduction features 112, and each section may further include a base plate portion. Alternatively, the noise reducer 110 may be a singular, unitary component.

In exemplary embodiments, as shown in FIGS. 2 through 8, at least a portion of the noise reduction features 112 each comprise a serration 120. While in exemplary embodiments the serrations 120 are generally V-shaped, in alternative embodiments the serrations 120 may be U-shaped, or may have any other shape or configuration suitable for reducing the noise being emitted from the rotor blade 16 during operation of the wind turbine 10.

In general, each of the serrations 120 may have a pressure side surface 122 and a suction side surface 124. Additionally, each of the serrations 120 may include a peripheral edge surface 126 disposed between and connecting the opposing surfaces 122, 124. Further, in general, each noise reduction feature 120 may define a periphery 128. In embodiments wherein the noise reduction features 120 are serrations, the periphery 128 may be defined by the peripheral edge surface 126 and/or the pressure side surface 122 and suction side surface 124, as shown.

It should be understood, however, that the present disclosure is not limited to serrations 120. For example, in some embodiments, the noise reduction features 120, or some portion thereof, may comprise bristles. Alternatively, the noise reduction features may comprise any suitable apparatus configured to interact with the wind flow to reduce the noise associated with the rotor blade 16.

As shown in FIGS. 2 through 8, the noise reducer 110 of the present disclosure includes a plurality of auxiliary noise reduction features 130. In general, the auxiliary noise reduction features 130 may further interact with the wind flow past the noise reducer 110 when the rotor blade assembly 100 is in operation, and may further reduce the noise associated with the rotor blade 16. For example, during operation of the wind turbine 10, the direction of the wind flow past the noise reducer 110 may change or vary. The noise reduction features 112 may, in some embodiments, be designed for optimal noise reduction when the wind flows past the noise reducer 110 in a particular direction. Thus, when the direction of the wind flow changes or varies, the noise reduction features 112 may not provide optimal noise reduction. The auxiliary noise reduction features 130 may thus provide additional noise reduction capabilities to the noise reducer 110, supplementing the noise reduction capabilities of the noise reduction features 112. The auxiliary noise reduction features 130 may thus be particularly beneficial when the direction of wind flow past the noise reducer 110 changes or varies, as discussed above.

Each of the plurality of auxiliary noise reduction features 130 may be configured on at least one of the plurality of noise reduction features 112. For example, as discussed below, in some embodiments, an auxiliary noise reduction feature 130 may be configured on the pressure side surface 122 or the suction side surface 124 of a noise reduction feature 112. Additionally or alternatively, an auxiliary noise reduction feature 130 may be configured on the peripheral edge surface 126 of a noise reduction feature 112, or may otherwise be configured on the periphery 128 of a noise reduction feature 112. Further, in some embodiments, an auxiliary noise reduction feature 130 may be configured at an intersection between adjacent noise reduction features 112. For example, an auxiliary noise reduction feature 130 may be configured at an intersection and on the peripheral edge surface 126 or periphery 128 of adjacent noise reduction features 112.

FIGS. 2, 3, 5, and 6 illustrate a noise reducer 110 including one embodiment of the auxiliary noise reduction feature 130 of the present disclosure. In these embodiments, the auxiliary noise reduction features 130 each comprise a plurality of bristles 140. Thus, at least a portion of the auxiliary noise reduction features 130 may comprise a plurality of bristles 140. Each of the plurality of bristles 140 may extend from a surface of the noise reduction feature 112 that the bristles 140 are configured on. For example, in embodiments wherein the noise reduction features 112 are serrations 120, the bristles 140 may extend from, for example, the pressure side surface 122, the suction side surface 124, or, as shown, the peripheral edge surface 126.

In some embodiments, as shown, the bristles 140, or at least a portion thereof, may extend generally perpendicularly with respect to a surface of the rotor blade 16. For example, the bristles 140, or at least a portion thereof, may extend generally perpendicularly with respect to the surface of the rotor blade 16 on which the noise reducer 110 is configured, or with respect to a surface which the noise reducer 110 is adjacent to. In exemplary embodiments, as shown, at least a portion of the bristles 140 may be generally perpendicular with respect to the trailing edge 28 of the rotor blade 16.

In other embodiments, the bristles 140, or at least a portion thereof, may extend generally perpendicularly with respect to the noise reduction features 112, such as with respect to the surface of the noise reduction feature 112 on which the bristles 140 are configured. In some embodiments, for example, at least a portion of the bristles 140 may be generally perpendicular with respect to the peripheral edge 126 or the periphery 128.

Further, in other embodiments, the bristles 140, or at least a portion thereof, may extend in a range between approximately 5 degrees and approximately 90 degrees from perpendicular to a surface of the rotor blade 16. In other embodiments, the bristles 140, or at least a portion thereof, may extend in a range between approximately 5 degrees and approximately 90 degrees from perpendicular with respect to the noise reduction features 112, such as with respect to the surface of the noise reduction feature 112 on which the bristles 140 are configured.

It should be understood, however, that the bristles 140 according to the present disclosure are not limited to the orientations as disclosed above, and rather that bristles 140 extending from noise reduction features 112 at any suitable angles are within the scope and spirit of the present disclosure.

The bristles 140 according to the present disclosure may generally be formed from any material suitable to provide the desired noise reduction characteristics. For example, the bristles 140 in some embodiments may be formed from thermoplastics or thermoplastic glass composite fibers. Alternatively, the bristles 140 may be formed from, for example, a nylon, a polyester, a kevlar, or any suitable composite thereof. It should be understood, however, that the present disclosure is not limited to the above disclosed materials, and rather that any suitable materials are within the scope and spirit of the present disclosure.

FIG. 4 illustrates a noise reducer 110 including another embodiment of the auxiliary noise reduction feature 130 of the present disclosure. In these embodiments, the auxiliary noise reduction features 130 each comprise a plurality of tufts 150. Thus, at least a portion of the auxiliary noise reduction features 130 may comprise a plurality of tufts 150. In general, a tuft 150 is a group of strands 152, such as bristles or other suitable apparatus made of any suitable materials, which generally converge together at one end and generally diverge as they extend from that end. For example, as shown in FIG. 4, each tuft 150 includes a plurality of strands 152 that extend between first convergent ends 154 and second divergent ends 156. Each of the plurality of tufts 150 may extend from a surface of the noise reduction feature 112 that the tufts 150 are configured on. For example, in embodiments wherein the noise reduction features 112 are serrations 120, the tufts 150 may extend from, for example, the pressure side surface 122, the suction side surface 124, or, as shown, the peripheral edge surface 126.

FIGS. 7 and 8 illustrate a noise reducer 110 including another embodiment of the auxiliary noise reduction feature 130 of the present disclosure. In these embodiments, the auxiliary noise reduction features 130 each comprise a porous layer 160. Thus, at least a portion of the auxiliary noise reduction features 130 may comprise a porous layer 160. Each of the porous layers 160 may be situated adjacent a noise reduction feature 112. For example, in embodiments wherein the noise reduction features 112 are serrations 120, a porous layer 160 may be situated adjacent, for example, the pressure side surface 122, the suction side surface 124, or, as shown, the peripheral edge surface 126.

The porous layer 160 may, in some embodiments, comprise a felt material. Alternatively, the porous layer 160 may be any porous material suitable for reducing the noise associated with the rotor blade 16.

In exemplary embodiments, the auxiliary noise reduction features 130, or a portion thereof, may extend beyond the periphery 128 of the noise reduction features 112 on which the auxiliary noise reduction features 130 are configured. For example, in embodiments wherein the noise reduction features 112 are serrations 120, the auxiliary noise reduction features 130 may extend beyond the peripheral edge surface 126 and/or the periphery 128 of the serrations 120. FIGS. 2 through 6 illustrate the bristles 140 and tufts 150 extending from the peripheral edge surface 126 of various serrations 120, and thus extending beyond the peripheral edge surface 126 and the periphery 128 of the serrations 120. Similarly, FIGS. 7 and 8 illustrate the porous layers 160 disposed adjacent the suction side surface 124 and extending beyond the peripheral edge surface 126 and the periphery 128 of the serrations 120.

The noise reduction features 112 and auxiliary noise reduction features 130 may be formed and attached utilizing any suitable processes and/or apparatus. For example, in some embodiments, noise reduction features 112 may be injection molded with various auxiliary noise reduction features 130, such as the bristles 140 and/or the tufts 150, included therein. Alternatively, various auxiliary noise reduction features 130 may be formed and placed into a mold, and the noise reduction features 112 injection molded around the auxiliary noise reduction features 130. Alternatively, the auxiliary noise reduction features, such as the bristles 140, the tufts 150, and/or the porous layers 160, may be mounted to the noise reduction features 112 through any suitable adhesive, any suitable bonding technique, or any suitable mechanical fasteners.

Alternatively, the auxiliary noise reduction features 130 may be mounted to the noise reduction features 112 through various channels 170 and mounting features 172. As shown in FIGS. 5 and 6, for example, the noise reduction features 112, or a portion thereof, may each define a channel 170 or channels 170 therein. Further, mounting features 172 may be provided, and the mounting features 172 may be configured to mate with the channels 170. For example, the mounting features 172 may generally be shaped and sized to fit within the channels 170. Auxiliary noise reduction features 130 may be configured on the mounting features 172. To configure the auxiliary noise reduction features 130 on the noise reduction features 112, the mounting features 172 may thus be mated with the channels 170. The auxiliary noise reduction features 130 may protrude from the channels 170.

As shown in FIGS. 5 and 6, for example, in embodiments wherein the noise reduction features 112 are serrations 120, channels 170 may be defined in the peripheral edge surfaces 126 of the channels 170. Alternatively, however, the channels 170 may be defined in the pressure side surface 122 or the suction side surface 124, or may be defined anywhere in the periphery 128 of a noise reduction feature 112.

The channels 170 and mounting features 172 may allow the noise reduction features 112 and auxiliary noise reduction features 130 to be formed separately and configured together as desired or required. In some embodiments, for example, the noise reducer 110 may be utilized without the auxiliary noise reduction features 130 during some wind conditions and utilized with the auxiliary noise reduction features 130 during other wind conditions. The channels 170 and mounting features 172 allow for the auxiliary noise reduction features 130 to be easily and efficiently configured on the noise reduction features 112.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, comprising:
a rotor blade having exterior surfaces defining a pressure side, a suction side, a leading edge, and a trailing edge extending between a tip and a root, the exterior surfaces forming a continuous aerodynamic profile; and,
a noise reducer mounted on an exterior surface of the rotor blade, the noise reducer comprising:
a plurality of noise reduction features each comprising a first end spaced from the rotor blade and a second end proximate the rotor blade relative to the first end, and,
a plurality of auxiliary noise reduction features, each of the plurality of auxiliary noise reduction features configured on at least one of the plurality of noise reduction features, and wherein at least one of the plurality of auxiliary noise reduction features is configured on one of the plurality of noise reduction features between the first end and the second end.

2. The rotor blade assembly of claim 1, wherein at least a portion of the plurality of auxiliary noise reduction features each comprises a plurality of bristles.

3. The rotor blade assembly of claim 2, wherein at least a portion of the plurality of bristles extends generally perpendicularly with respect to a surface of the rotor blade.

4. The rotor blade assembly of claim 2, wherein at least a portion of the plurality of bristles extends generally perpendicularly with respect to a surface of one of the plurality of noise reduction features.

5. The rotor blade assembly of claim 1, wherein at least a portion of the plurality of auxiliary noise reduction features each comprises a plurality of tufts.

6. The rotor blade assembly of claim 1, wherein at least a portion of the plurality of auxiliary noise reduction features each comprises a porous layer.

7. The rotor blade assembly of claim 1, wherein each of the plurality of noise reduction feature's defines a periphery, and wherein at least a portion of the plurality of auxiliary noise reduction features each extends beyond the periphery of the noise reduction feature on which the auxiliary noise reduction feature is configured.

8. The rotor blade assembly of claim 1, wherein at least a portion of the plurality of noise reduction features each defines a channel, further comprising a plurality of mounting features configured to mate with the channels, and wherein at least a portion of the plurality of auxiliary noise reduction features are configured on the mounting features.

9. The rotor blade assembly of claim 1, wherein at least a portion of the plurality of noise reduction features each comprises a serration.

10. The rotor blade assembly of claim 1, wherein the noise reducer is configured adjacent the trailing edge of the rotor blade.

11. A rotor blade assembly for a wind turbine, comprising:
a rotor blade having exterior surfaces defining a pressure side, a suction side, a leading edge, and a trailing edge extending between a tip and a root, the exterior surfaces fanning a continuous aerodynamic profile; and,
a noise reducer mounted on an exterior surface of the rotor blade and adjacent the trailing edge of the rotor blade, the noise reducer comprising:
a plurality of serrations, each of the plurality of serrations having a pressure side surface, a suction side surface, and a peripheral edge surface therebetween, each of the plurality of serrations further comprising a first end spaced from the rotor blade and a second end proximate the rotor blade relative to the first end, and,
a plurality of auxiliary noise reduction features, each of the plurality of auxiliary noise reduction features configured on a surface of at least one of the plurality of serrations, and wherein at least one of the plurality of auxiliary noise reduction features is configured on one of the plurality of serrations between the first and the second end.

12. The rotor blade assembly of claim 11, wherein at least a portion of the plurality of auxiliary noise reduction features each comprises a plurality of bristles, each of the plurality of bristles extending from the peripheral edge surface of one of the plurality of serrations.

13. The rotor blade assembly of claim 12, wherein at least a portion of the plurality of bristles extends generally perpendicularly with respect to the trailing edge of the rotor blade.

14. The rotor blade assembly of claim 12, wherein at least a portion of the plurality of bristles extends generally perpendicularly with respect to the peripheral edge surface of one of the plurality of serrations.

15. The rotor blade assembly of claim 11, wherein at least a portion of the plurality of auxiliary noise reduction features each comprises a plurality of tufts, each of the plurality of tufts extending from the peripheral edge surface of one of the plurality of serrations.

16. The rotor blade assembly of claim 11, wherein at least a portion of the plurality of auxiliary noise reduction features each comprises a porous layer, each of the porous layers situated adjacent one of the pressure side surface or the suction side surface of one of the plurality of serrations.

17. The rotor blade assembly of claim 16, wherein at least a portion of the plurality of porous layers extends beyond the peripheral edge surface of the serration on which the porous layer is situated.

18. The rotor blade assembly of claim 11, at least a portion of the plurality of serrations each defining a channel, further comprising a plurality of mounting features configured to mate with the channels, and wherein at least a portion of the plurality of auxiliary noise reduction features are configured on the mounting features.

19. The rotor blade assembly of claim 18, wherein at least a portion of the channels are defined in the peripheral edge surfaces of the serrations.

20. A wind turbine, comprising:
a plurality of rotor blades, each of the plurality of rotor blades having exterior surfaces defining a pressure side, a suction side, a leading edge, and a trailing edge extending between a tip and a root, the exterior surfaces forming a continuous aerodynamic profile; and,
a noise reducer mounted on an exterior surface of at least one of the plurality of rotor blades, the noise reducer comprising:
a plurality of noise reduction features each comprising a first end spaced from the rotor blade and a second end proximate the rotor blade relative to the first end, and,
a plurality of auxiliary noise reduction features, each of the plurality of auxiliary noise reduction features configured on at least one of the plurality of noise reduction features, and wherein at least one of the plurality of auxiliary noise reduction features is configured on one of the plurality of noise reduction features between the first end and the second end.

* * * * *

UNITED STATES PATENT AND TRADEMARK OFFICE
CERTIFICATE OF CORRECTION

PATENT NO. : 8,267,657 B2
APPLICATION NO. : 12/970119
DATED : September 18, 2012
INVENTOR(S) : Huck et al.

It is certified that error appears in the above-identified patent and that said Letters Patent is hereby corrected as shown below:

In the Claims:

Column 8, line 22 "feature's" should read --features--;
Column 8, line 43 "fanning" should read --forming--.

Signed and Sealed this
Seventeenth Day of September, 2013

Teresa Stanek Rea
*Deputy Director of the United States Patent and Trademark Office*